(12) United States Patent
Wilkinson

(10) Patent No.: US 8,868,874 B2
(45) Date of Patent: Oct. 21, 2014

(54) MANAGING REMOTE DATA REPLICATION

(75) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/363,542

(22) Filed: Feb. 1, 2012

(65) Prior Publication Data

US 2013/0198477 A1    Aug. 1, 2013

(51) Int. Cl.
*G06F 17/30* (2006.01)

(52) U.S. Cl.
CPC ...................................... *G06F 17/30* (2013.01)
USPC ..................... 711/167; 711/161; 711/E12.103

(58) Field of Classification Search
CPC ....................................................... G06F 17/30
USPC .................. 711/141, 154, 161, 162, 167, 611
See application file for complete search history.

(56) References Cited

U.S. PATENT DOCUMENTS

| | | | |
|---|---|---|---|
| 7,254,685 B1 * | 8/2007 | Cardente ........................ | 711/162 |
| 7,475,207 B2 * | 1/2009 | Bromling et al. .............. | 711/162 |
| 7,925,629 B2 | 4/2011 | Webman et al. | |
| 7,979,652 B1 | 7/2011 | Sivasubramanian | |
| 8,001,307 B1 | 8/2011 | Gole et al. | |
| 2004/0133634 A1 * | 7/2004 | Luke et al. ..................... | 709/203 |
| 2004/0236983 A1 * | 11/2004 | Burton et al. ...................... | 714/6 |
| 2005/0138308 A1 * | 6/2005 | Morishita et al. .............. | 711/162 |
| 2005/0213389 A1 * | 9/2005 | Iwamura et al. ......... | 365/185.22 |
| 2006/0069865 A1 * | 3/2006 | Kawamura et al. ........... | 711/114 |
| 2007/0061529 A1 * | 3/2007 | Eastman et al. .............. | 711/162 |
| 2008/0059738 A1 * | 3/2008 | Burr et al. ...................... | 711/162 |
| 2008/0243950 A1 | 10/2008 | Webman et al. | |
| 2009/0313311 A1 | 12/2009 | Hoffmann et al. | |
| 2010/0049926 A1 * | 2/2010 | Fuente et al. .................. | 711/162 |
| 2010/0049927 A1 * | 2/2010 | Fuente et al. .................. | 711/162 |
| 2011/0082833 A1 * | 4/2011 | Kamimura ..................... | 707/624 |

OTHER PUBLICATIONS

Anonymous, Merge Overlap Writes in Disk Controller, Jun. 10, 1990. Research Disclosure, 314013, 1.*
Singhal, Rekha et al. "Design and Implementation of Efficient Semi-Synchronous Replication Solution for Disaster Recovery" (on-line), Recent Advances in Software Engineering, Parallel and Distributed Systems (retrieved from http://www.wseas.us/e-library/conferences/2010/Cambridge/SEPADS/SEPADS-18.pdf), 2010 (retrieved in Aug. 2011), pp. 109-114, Centre for Development of Advance Computing, India (6 pages).
Microsoft Technet, "How Volume Shadow Copy Service Works" (on-line), (retrieved from http://technet.microsoft.com/en-us/library/cc785914(d=printer,v=WS.10).aspx), Mar. 28, 2003 (retrieved on Dec. 14, 2011), Microsoft Corporation (8 pages).

(Continued)

*Primary Examiner* — April Y Blair
*Assistant Examiner* — Kenneth Tsang
(74) *Attorney, Agent, or Firm* — James L. Baudino

(57) ABSTRACT

Various systems, processes, and products may be used to manage remote replication of data. In particular implementations, a system, process, and product for managing remote replication of data may include the ability to receive writes from an external system, request an ordered index for the writes, and send the writes to at least one storage system. The system, process, and product may also include the ability to receive writes from the at least one storage system, receive ordered indexes for the writes from the external system and the at least one storage system, and store the writes based on the indexes.

17 Claims, 7 Drawing Sheets

(56) References Cited

OTHER PUBLICATIONS

Wikipedia, "Snapshot (Computer Storage)" (on-line), (retrieved from http://en.wikipedia.org/wiki/Snapshot_(computer_storage)), (retrieved on Oct. 12, 2011) Wikipedia (3 pages).

Wikipedia, "Replication (computer science)" (on-line), (retrieved from http://en.wikipedia.org/wiki/Replication_(computer_science)), (retrieved on Dec. 12, 2011) Wikipedia (7 pages).

International Search Report and Written Opinion; International Application No. PCT/IB2013/050737; Jul. 4, 2013.

* cited by examiner

MANAGING REMOTE DATA REPLICATION

BACKGROUND

The present invention relates to storage systems, and more specifically to managing data replication between storage systems.

It is common to require both read and write access to a synchronously replicated disk through more than one storage system at multiple locations. The typical solution is to use a single location (e.g., a storage system) to resolve ordering between the writes submitted from the various locations, and then process the writes on each replica. Until the write has been completed on each replica, the initial write submitted to the storage systems may not be completed. This means that the externally-visible write latency is the sum of the time taken to transmit a message to the resolving location, transmit a message from the resolving location to each replica furthest from it, process and complete the write at each replica, and transmit messages from each replica back to the originating location. The transmission between locations may take multiple milliseconds and the storage time may be multiple milliseconds. Thus, the time to process and complete a write may take tens of milliseconds.

BRIEF SUMMARY

In one implementation, a system for managing remote data replication may include an index generator adapted to receive a plurality of requests and generate a plurality of responses for each request where each response contains a sequenced index based on the order in which the request was received, and at least two storage systems communicating with each other to store writes received from one or more external systems in a synchronous manner. Each storage system is adapted to receive writes from an external system, request an index from the index generator for each write, send the writes to at least one other storage system, receive writes from the at least one other storage system, receive indexes from the index generator for writes from the at least one other storage system, and store the writes from the external system and the at least one other storage system based on the ordered indexes received from the index generator.

The details and features of various implementations will be conveyed by the following description, along with the drawings.

DETAILED DESCRIPTION

Figure 1:
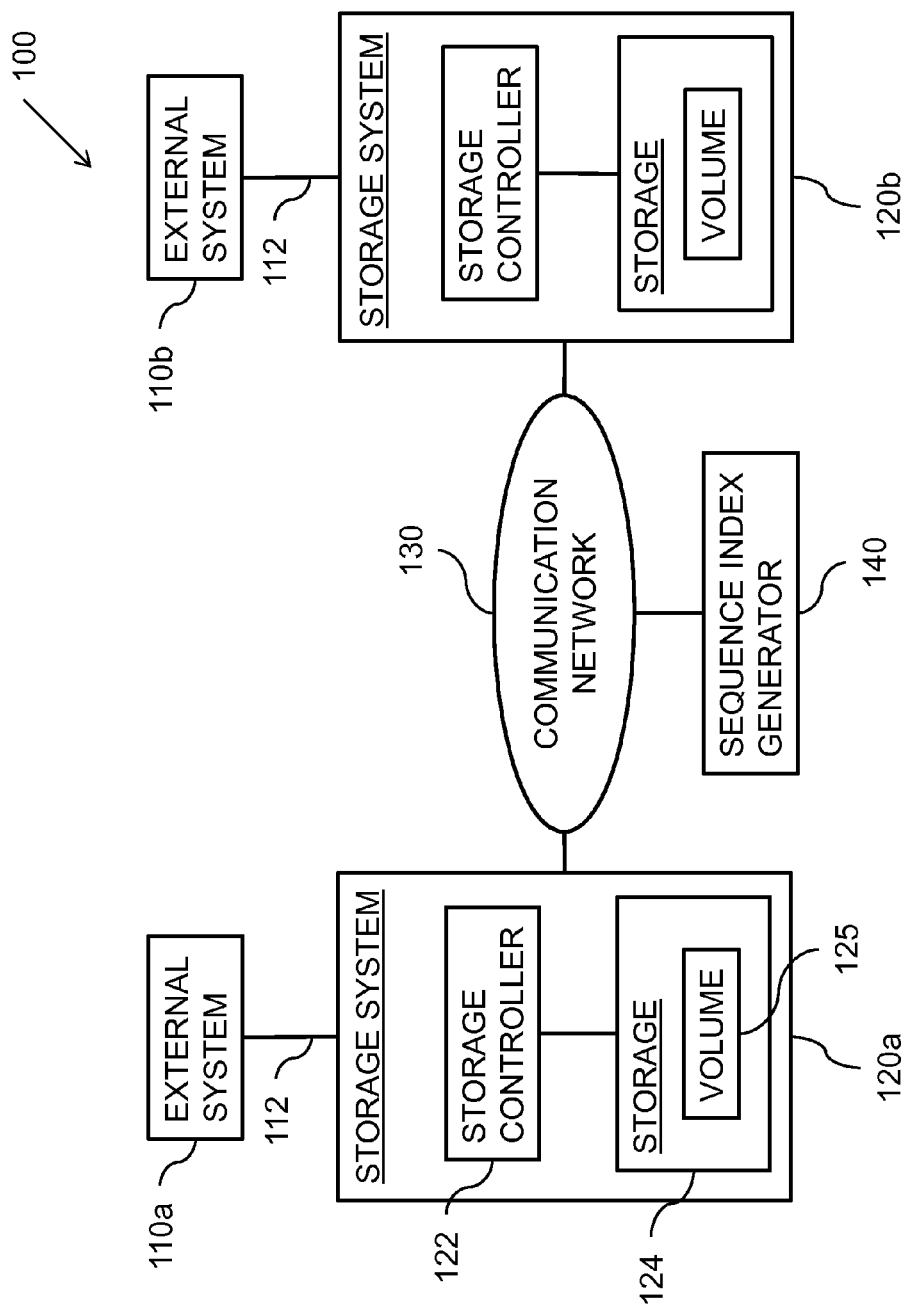
FIG. 1 is a block diagram illustrating an example system for managing remote replication of data.

Managing remote data replication may be achieved by various techniques. In particular implementations, managing remote data replication may be performed by a number of synchronously operating storage systems that access a common index generator to obtain sequential indexes for writes received by the storage systems. By using the indexes for the writes, which may, for example, be from external server systems, the storage systems may be able to store the writes in the proper order. Moreover, in certain implementations, the indexes may allow the storage systems to start storing writes even when the storage systems do not yet know the proper order, which may decrease storage time. Furthermore, the indexes may allow the storage systems to skip storing certain writes when the storage systems have stored the writes out of order, which may also decrease storage time.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for managing the remote replication of data. System 100 includes external systems 110, storage systems 120, a communication network 130, and an index generator 140.

External systems 110 may generally be any computer systems that have their data stored by generating writes to storage systems 120. External systems 110 may, for example, be server systems that have data that needs to be stored. Example server systems include Web servers. If external systems are server systems, each of the server systems may include one or more servers, which may be co-located or distributed.

External systems 110 communicate with storage systems 120 over communication links 112. Communication links 112 may, for example, be part of a local area network, a wide area network, or the Internet. Communication links 112 may operate by wireline (e.g., cable or fiber optic) and/or wireless (e.g., radio frequency) techniques.

Storage systems 120 store data for external systems 110. Storage systems 120 may, for example, be storage area networks, raid arrays, hard drives, tape drives, or any other device for storing data. Each of storage systems 120 includes a storage controller 122 and storage 124 (e.g., a hard disk, a tape, etc.). Storage controllers 122 are responsible for actually placing the data in storage 124. Additionally, storage controllers 122 coordinate with each other to make sure that the writes to one storage system are applied to the other storage system. Each of storages 124 includes a replica of a volume that is to be kept consistent between storage systems 120. Volume 125 could, for example, be a physical device (e.g., a disk) or a representation of a physical device.

In particular implementations, storage systems 120 may operate in a synchronous manner for volume 125. Thus, when one of external systems 110 submits a write to one of storage systems 120, the external system will not receive successful completion until all replicas of volume 125 have committed the write. Synchronous storage systems are commonly located within 100 km of each other, but that is not a requirement for various implementations.

Storage systems 120 are communicatively coupled to each other through communication network 130. Communication network 130 may, for example, be a local area network, a wide area network, or the Internet. Storage systems may be coupled to communication network 130 through communication links 132, which may include one or more wireline (e.g., cable or fiber optic) or wireless links (e.g., radio frequency). In particular implementations, external systems 110 may be coupled to storage system 120 through a communication network like communication network 130 or through communication network 130 itself.

Index generator 140 is operable to provide a sequence index when queried by storage systems 120. The index could be a number in a sequence of numbers (e.g., a series of integers), a timestamp, or any other indication that provides a canonical order for the requests. The sequence indexes can be used to resolve colliding writes (e.g., those that are received contemporaneously) and allow the resolution to run in parallel with the writes to back-end storage. Index generator 140 could, for example, be implemented as a computer program running on one of storage systems 120, one of storage controllers 122, one of external systems 110, or another general purpose computer or fixed purpose device with access to communication network 130.

Note that storage systems 120 may have a number of volumes that are being replicated between them. If storage system 120a has 100 volumes replicated to 100 volumes of storage system 120b, the following design applies to each individually. Moreover, there may be a single index generator or many, as long as a single sequence index is used for writes to replicas of a single volume.

In certain modes of operation, when either of storage systems 120 receives a write from the associated external system 110, the receiving storage system may accept the write, start local storage operations it locally (e.g., moving a hard disk head to the correct place) unless it detects a potentially colliding write, request a sequence index from index generator 140, and send the write to the other volumes 125. When the index generator receives the request, it sends a sequence index for the write to both storage systems 120. When a storage system 120 has received the sequence index and the write data, the storage system can detect and resolve any collisions according to the following scenarios.

If any earlier writes have not yet been received, the storage system should wait for them (scenario 1). If all earlier writes (as signified by the sequence index) have been received, and no earlier incomplete writes overlap with it, the storage system may start committing the write (i.e., start storage operations) (scenario 2). The storage operations may, for example, be started by issuing the write to the physical storage for the associated volume (e.g., disk). If the write has already been committed (i.e., the writing process is complete), success can be returned to the originating storage system 120 because there were no colliding writes.

Overlapping writes are those that are being written to the same region of storage. A region of storage may, for example, be a disk block, a logical block address (LBA), a sector, a file, or any other allocation unit of storage. Note that two writes do not need to be written to the identical set of regions to overlap;

writes may be overlapping if they have any regions in common between. Furthermore, writes may overlap and be overlapped by many other writes. When waiting for an overlapped write to finish before completing it to the external system from which it originated, the systems may wait for the writes with which the write overlaps to finish before completing the write back to the external system.

A write is typically incomplete when there is some further processing to be performed for the write. For example, for the storage system that first receives the write, the write is not complete until it is ready to be reported to the originating external system (e.g., the write has completed on the local physical storage, a write completion message has been received from the other storage system, and a sequence index has been received from the index generator so that it may be determined whether no earlier overlapping writes exist). For a storage system that did not originally receive the write, a write is incomplete up to the point where a successful write is completed back to the storage system that originally received the write.

If any earlier writes (as signified by the sequence index) have been received that overlap the write and are still incomplete, and the write has not yet been committed, the writing of the current write should wait for the earlier writes to complete (scenario 3). The current write can then be processed as if there are no overlapping, incomplete writes (scenario 2). Thus, the storage systems can detect that there are colliding writes and process them in the correct order.

If any earlier writes (as signified by the sequence index) have been received that overlap the write and are still incomplete, and the storage system has already started to write the current write, the writing of the earlier writes must not have started yet. The storage system can then decide not to write the earlier writes and return success to the originating storage system for the write and all earlier overlapping, incomplete writes when writing for the current write has completed (scenario 4). This may occur because the storage system knows there are colliding writes, and it has processed them in the wrong order. The storage systems can make use of the fact that none of the overlapping, incomplete writes have been completed to an external system yet so it is at liberty to logically undo the earlier overlapping, incomplete writes by ignoring them and simply writing the later write. If the earlier writes only partially overlap, any portion of the earlier writes that do not overlap the current write should be written before success is returned for these writes.

The originating storage system 120 collates expected returns from the storage systems 120 (including itself). The other storage system then completes the write to the associated external system 110 when all storage systems report they have been updated.

Figure 2:
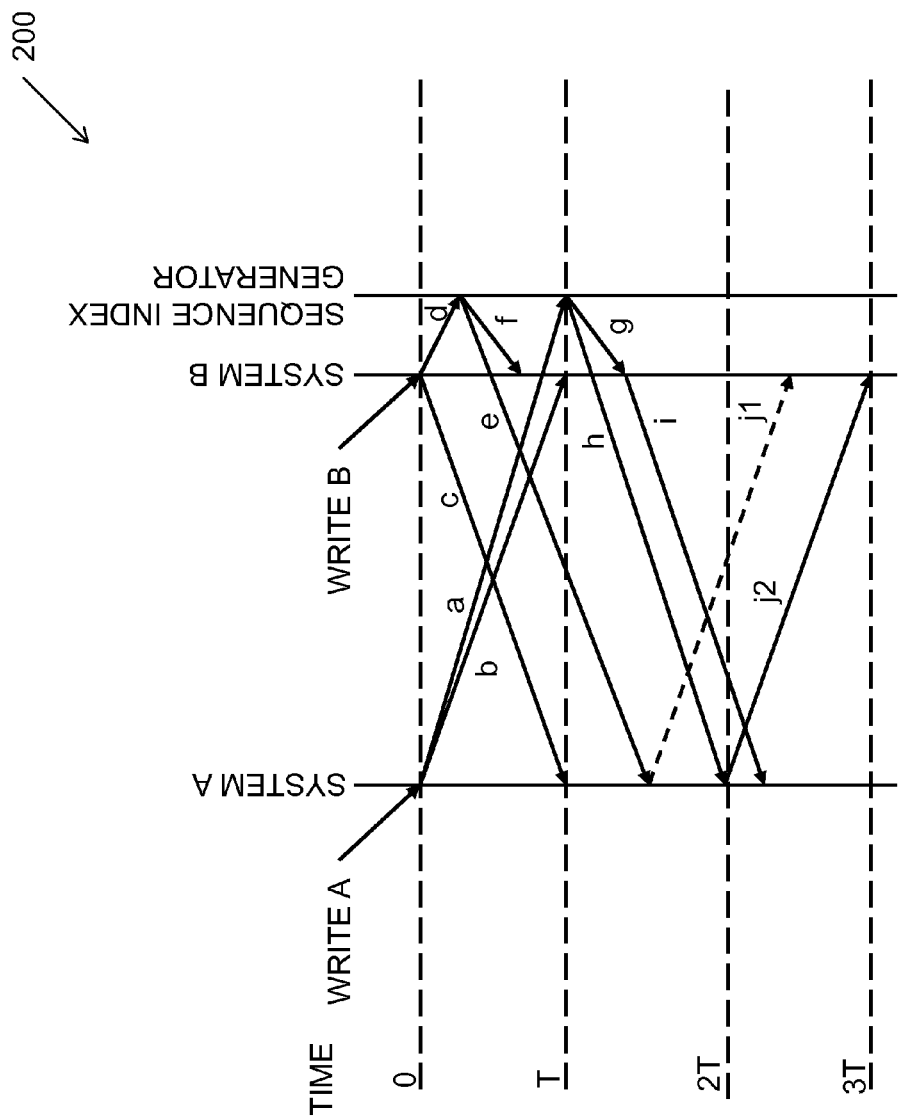
FIG. 2 is a flow diagram illustrating an example process for managing remote replication of data.
Figure 3A:
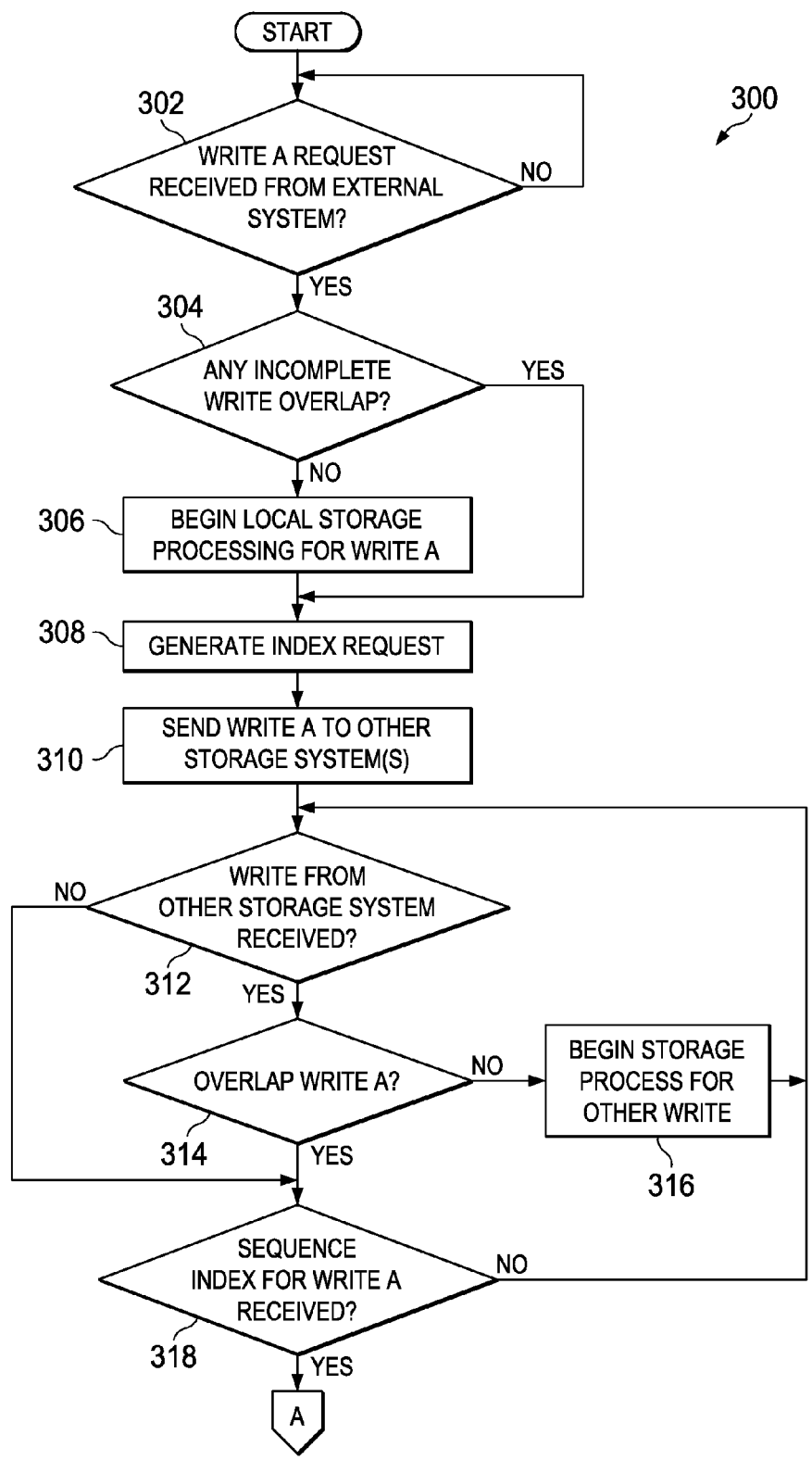
FIGS. 3A-D are a flowchart illustrating another example process for managing remote replication of data.
Figure 3B:
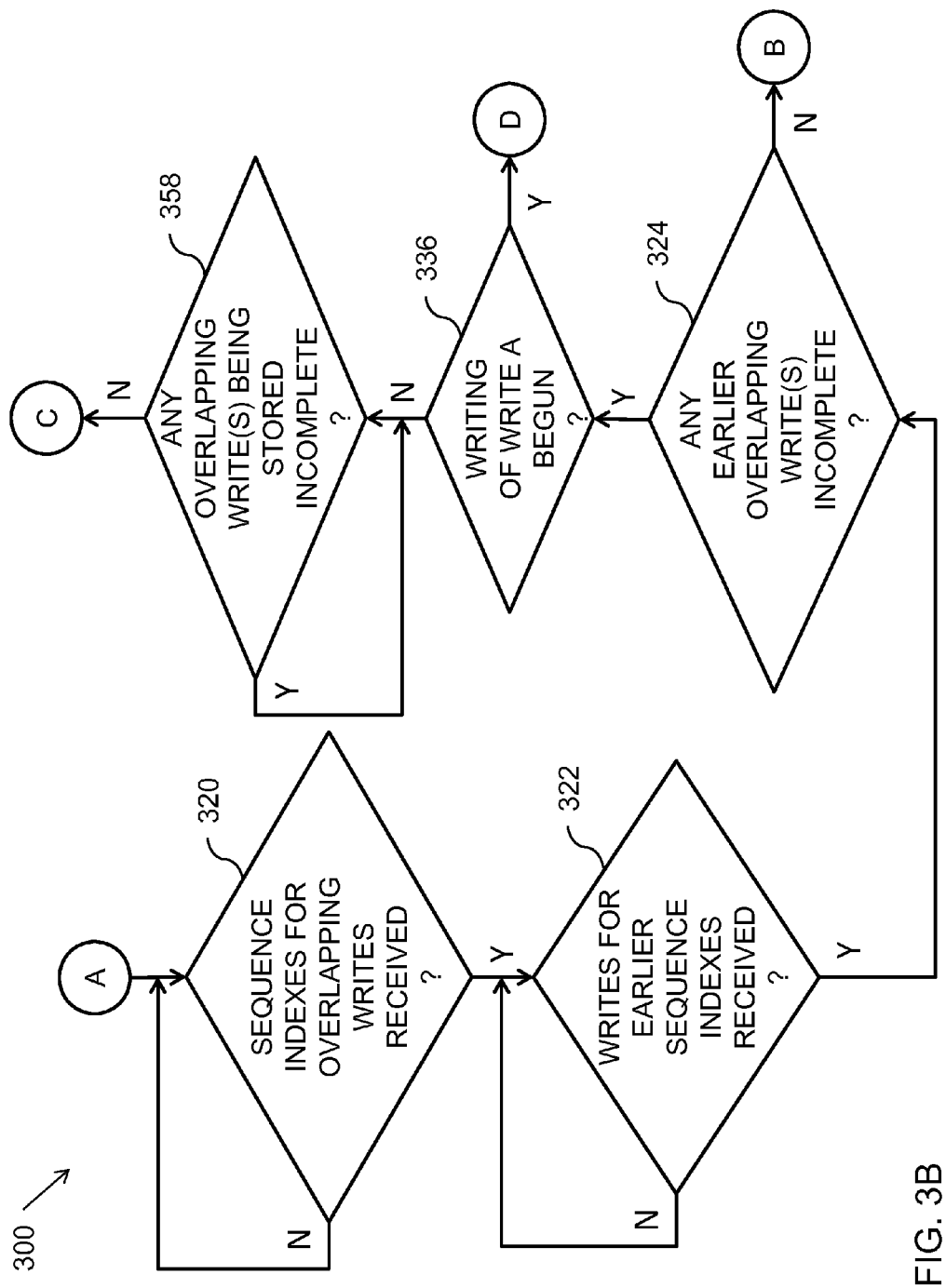
Figure 3C:
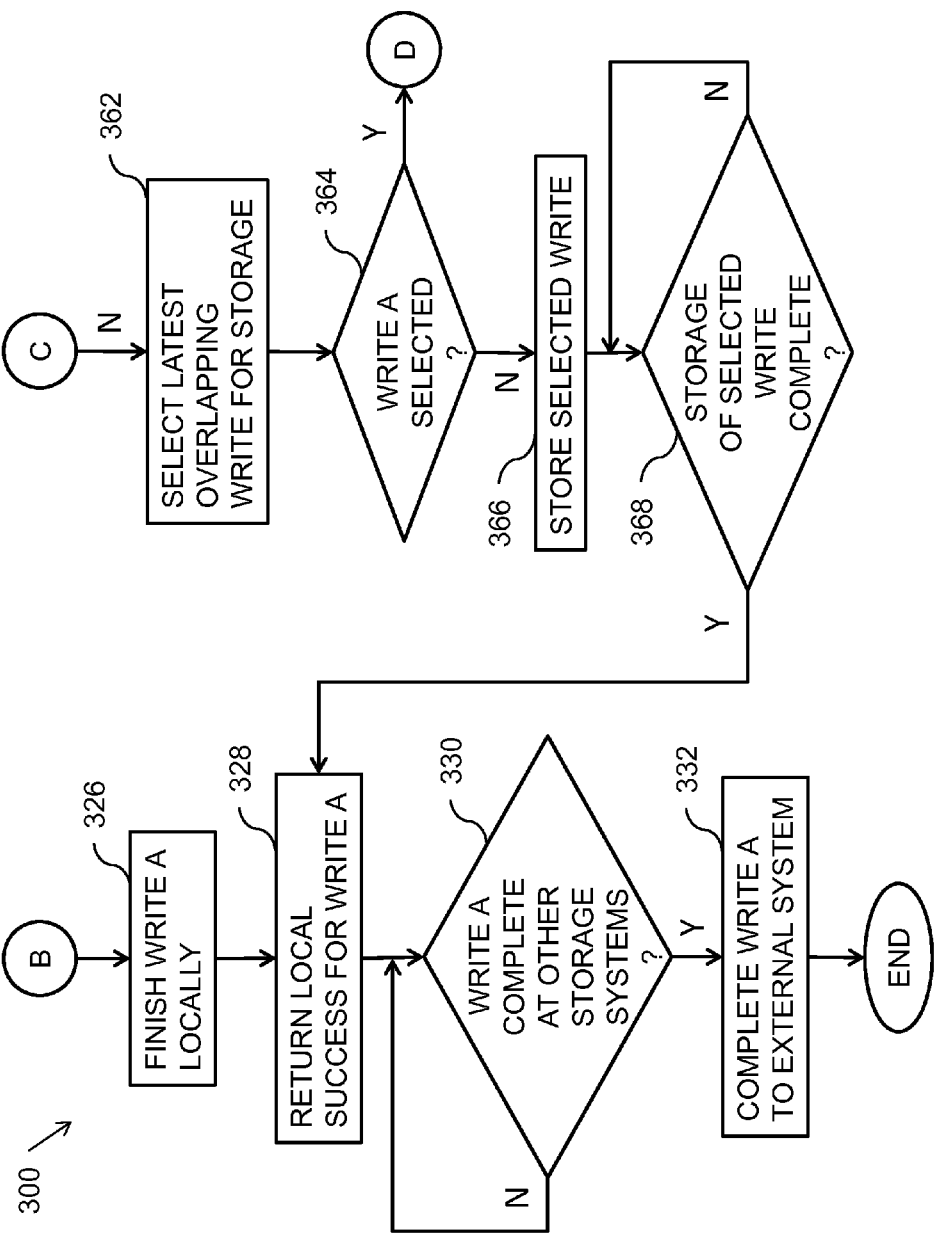
Figure 3D:
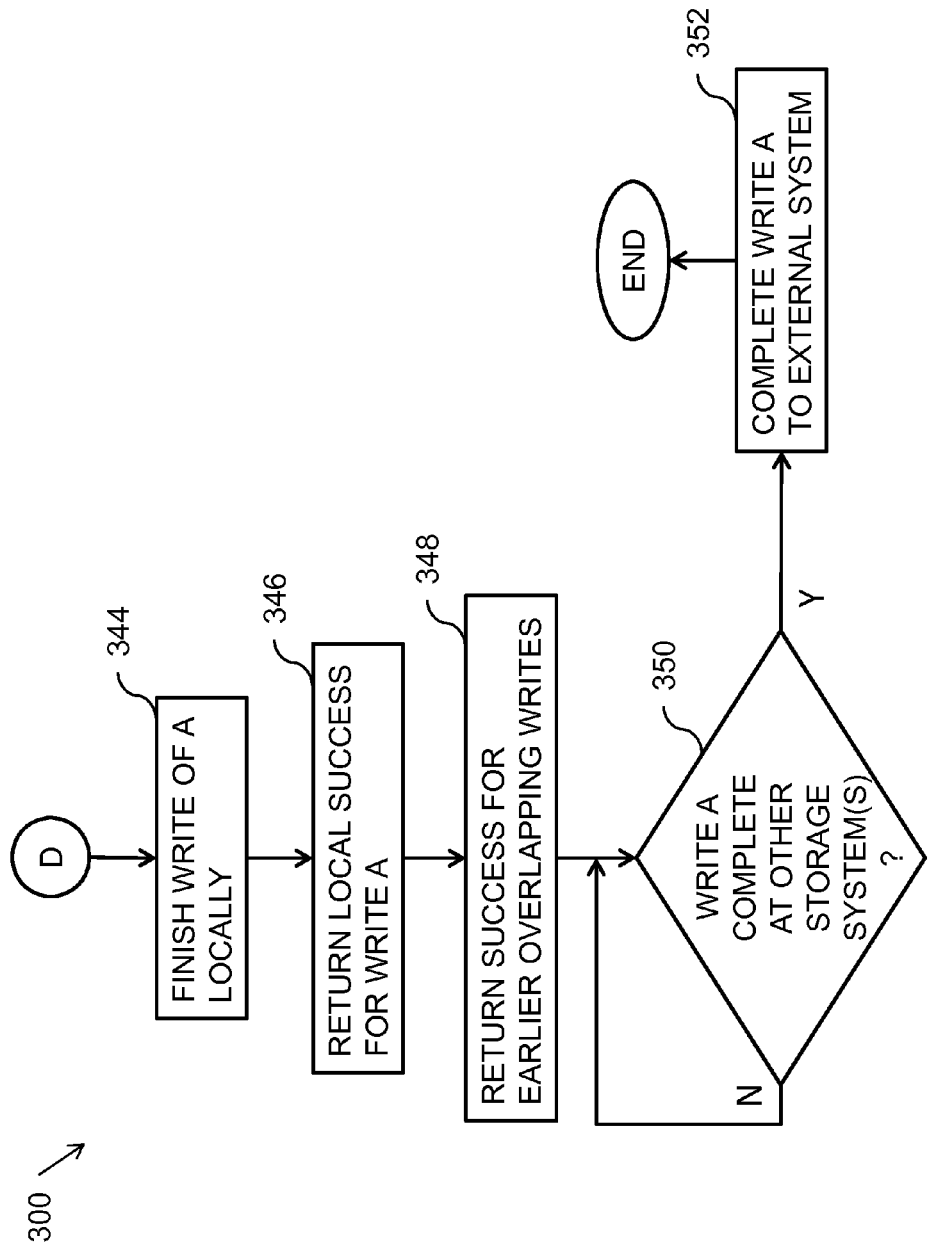

FIG. 2 illustrates an example process 200 for managing remote replication of data according to the scenarios. Process 200 is illustrated using two storage systems—storage system 120a and storage system 120b, but should work with any number of storage systems. Process 200 may run in parallel for each storage system.

For process 200, storage system 120a and storage system 120b are at a distance where the one-way trip time is t, and index generator 140 is shown as being nearer to (perhaps part of) storage system 120b. However, the specific location of the index generator is not critical.

Process 200 illustrates two overlapping writes—write A and write B—from external systems (e.g., server systems) being submitted respectively to storage system 120a and storage system 120b, respectively, at time 0. Upon receiving write A, storage system 120a starts committing write A to its storage. Additionally, storage system 120a transmits message a, requesting a sequence index for write A, to index generator 140, which is nearer to storage system 120b, and message b, containing the data to be written for write A, to storage system 120b. Similarly, storage system 120b starts committing write B, sends message c, containing the data to be written for write B, to storage system 120a, and sends message d, requesting a sequence index for write B, to the index generator.

Even if they do not detect any overlapping writes at the time of receipt, storage system 120a and storage system 120b do not complete the respective writes locally until they receive the sequence indexes from the index generator. Until the storage systems have a sequence index for a write and can examine the writes for the previous sequence indexes, it is possible that they may still receive a write for an earlier sequence index that overlaps with the writes, which may require special processing.

The index generator receives message d from storage system 120b shortly after time 0 and generates a sequence index such that any writes to the same or overlapping regions from either storage system 120a or storage system 120b are given different sequence indexes. In particular, the overlapping write that is received first may receive has a smaller sequence index. This could, for example, be achieved by giving each write a unique sequence index, with each getting a number one greater than that granted to the previous write. The index generator transmits the fact that write B has been given a sequence index to each storage system 120, with message e conveying it to storage system 120a and message f conveying it to storage system 120b.

Storage system 120b now has the write data and the sequence index for write B. Assuming that all earlier writes have been received and do not overlap with write B and that storage system 120b has completed writing write B by the time it receives message f, which contains the sequence index for write B, storage system 120b may operate according to scenario 2 above and return success for the write to itself. Storage system 120b cannot, however, complete the overall write to the external server, as it does not have completion for write B from storage system 120a yet.

When storage system 120a receives the write data for write B in message c at time t, the storage system detects that writes A and write B overlap (e.g., by comparing the written to regions). But storage system 120a has already started writing write A, and may have completed it, so the storage system waits for the sequence indexes for write A and write B to arrive—in messages h and message e, respectively—before it can successfully resolve the collision, as outlined in scenario 3 above. If write A and write B had not overlapped, storage system 120a could start writing write B immediately upon receiving message c.

The index generator receives message a from storage system 120a at time t and generates a sequence index for write A that is considered later than that for write B. The index generator sends the sequence index for write A to storage system 120a and storage system 120b as message h and message g, respectively.

Also at time t, storage system 120b receives message b, containing the write data for Write A, from storage system 120a at time t. If storage system 120b has already received all writes and sequence indexes for writes earlier than write B (which is likely given the proximity to the sequence index generator), it knows write A cannot be earlier than write B and, thus, must be later and can be considered for writing to storage system 120b's storage immediately. Storage system 120b may also infer this if it tracks sequence indexes. If storage system 120b has not received all writes and sequence indexes up to write B yet, the storage system waits for that or explicit confirmation of write A's sequence index first. As outlined in scenario 3 above, the storage system waits for write B to complete before it can start write A.

Storage system 120b receives message g, containing the sequence index for write A, from the index generator a short time after t. If necessary, the storage system can use this to explicitly order write A and write B. If write A had been given an earlier sequence index than write B, the storage system would not commit write A to storage system 120b's storage, but complete writes A and write B to their respective originating storage systems once write B has been committed on storage system 120b, as happened on storage system 120a with write A. But as write A has a later sequence index than write B, storage system 120b can start committing write A as soon as write B has been committed on storage system 120b, and write A and write B are completed to their respective originating storage system as they individually finish committing on storage system 120b. Message i is used to complete write A to storage system 120a.

Storage system 120a receives message e from the index generator a short time after time t, containing the sequence index for write B. If writes A and write B had not overlapped, storage system 120a could have completed write B back to storage system 120b as soon as it had committed write B and received message e, using message j1. This would have given write B a total latency of roughly 2t. As it is, storage system 120a waits for message h.

Storage system 120a receives message h from the index generator at time 2t, containing the sequence index for Write A. Storage system 120a has now started committing write A to its local replica, and it has the write data and sequence indexes for both write A and write B. Thus, the storage system knows that write A was second, and so should be the write with data committed to the local replica. As long as storage system 120a has finished committing write A to its local replica and has received all writes with a sequence index less than that of write A, it may consider the local replica update complete for both writes A and write B. Completion for write A is stored locally, and completion for write B is sent using message j2.

Storage system 120a receives message i from storage system 120b a short time after 2t, containing the completion for write A on storage system 120b. As storage system 120a has previously recorded completion of the update of write A on storage system 120a, it may complete the overall write to the external server with an overall latency of 2t Storage system 120b receives message j2 from Storage system 120a at 3t, containing the completion for write B on storage system 120a. As it has previously recorded completion of Write B on storage system 120b, storage system 120b may complete the overall write B to the external server with an overall latency of 3t.

The largest possible externally-visible latency for a write should be 4t, but this is only possible if a system sends a write to a remote system that has just started processing a write that will get a later sequence index: it will have to wait 2t until the later write gets its sequence index and both can complete. Note that this extra delay applies to overlapping writes being processed in the wrong order: the others should take 2t. The solution in the background section would always take at least 4t. Moreover, by allowing a storage system to begin storage processing while it requests an index, storage time may be approximately halved in certain instances.

Although FIG. 1 illustrates one implementation of a storage system for managing the remote replication of data, other storage systems for managing the remote replication of data may include fewer, additional, and/or a different combination of components. For example, communication links 112 could link external systems 110 to communication network 130. Thus, external systems 110, storage systems 120, and index generator 140 could communicate through communication network 130. As a further example, although system 100 has been discussed in terms of block storage, it could be implemented for other storage types (e.g., file). As another example, a system may have more than two storage systems storing their received writes based on the outlined scenarios.

FIGS. 3A-D illustrate an example process 300 for managing remote data replication. Process 300 may, for example, be performed by a storage system similar to those for system 100. In particular, each storage system could be independently operating according to the process.

Process 300 calls for determining whether a write (denoted "A" for the sake of discussion) has been received from an external system (operation 302). The external system may, for example, be a server system. If a write A has not been received from an external system, process 300 calls for waiting to receive a write A.

Once a write A has been received, process calls for determining whether there is any incomplete write (e.g., from an external system or from a storage system) that overlaps with write A (operation 304). A write may be incomplete, for example, if it has not been completed to storage at the local system or it has not been completed at a remote storage system. For example, referring to process 200, write B is incomplete from time 0 to time 3t on storage system B, write B is incomplete from time t to time 2t on storage system A, write A is incomplete from time 0 to time 2t on system A, and write A is incomplete from time t to the start of message i on system B.

If an incomplete, overlapping write does not exist, process 300 calls for beginning local storage processing for write A (operation 306). Process 300 then calls for generating a sequence index request for write A (operation 308). Additionally, if an incomplete, overlapping write does exist, process 300 calls for generating the sequence index request (operation 308). The sequence index request may be sent to a local or remote index generator.

Process 300 also calls for sending write A to other storage systems (operation 310) and determining whether writes from another storage system has been received (operation 312). If a write from another storage system has not been received, process 300 calls for determining whether a sequence index for write A has been received (operation 318). If a sequence index for write A has not been received, process 300 calls for again checking for a write from another storage system (operation 312).

If a write from another storage system has been received, process 300 calls for determining whether the write overlaps with write A (operation 314). Two writes may, for example, overlap a portion of the writes is being written to the same region on the volume. If the writes do overlap, process 300 calls for again checking whether the sequence index for write A has been received (operation 318). If, however, the writes do not overlap, process 300 calls for beginning the storage process for the other write (operation 316) and again checking for a write from another storage system (operation 312).

Once a sequence index has been received for write A, process 300 calls for determining whether sequence indexes for the overlapping writes have been received (operation 320). If the sequence indexes for overlapping writes have not been received, process 300 calls for waiting for those sequence indexes.

Process 300 also calls for determining whether writes associated with earlier sequence indexes, if any, have been received (operation 322). This determination may, for example, be made by analyzing the sequence index to determine if any earlier, non-received writes exist. If the writes associated with earlier sequence indexes have not been received, process 300 calls for waiting for those writes.

Process 300 further calls for determining if any earlier writes that overlap with write A are incomplete (operation 324). In no earlier overlapping writes are incomplete, process 300 calls for finishing the local writing of write A (operation 326). This may, for example, involve starting the write of write A locally, if for example, this operation was not started when write A was received or completing write operations for write A. Moreover, in certain implementations, write A may have already been written by this point in the process.

Process 300 also calls for returning a local success for write A (operation 328), and determining whether write A has completed at the other storage system(s) (operation 330). If write A has not completed at the other storage system(s), process 300 calls for waiting for write A to complete at the other storage system(s).

Once write A has completed at the other storage system(s), process 300 calls for completing write A to the external system that originated the write (operation 332). Process 300 is then at an end.

Returning to operation 324, if any earlier writes overlapping with write A are incomplete, process 300 calls for determining whether the writing of write A has begun (operation 336). If the writing of write A has begun, process 300 calls for finishing the local writing of A (operation 344). In certain situations, write A may have already been written by this point in the process. After write A has been written locally, process 300 calls for returning a local success for the write of write A (operation 346).

Process 300 also calls for returning successes (whether local or to other storage systems) for earlier, overlapping writes (operation 348). These writes may not have actually been written, but since write A has already completed and would have overwritten them anyway, the writes are treated as being complete.

Process 300 then calls for determining whether write A has completed at the other storage system(s) (operation 350). If write A has not completed at the other storage system(s), process 300 calls for waiting for write A to complete at the other storage system(s). Once write A has completed at the other storage system(s), process 300 calls for completing write A to the external system that originated the write (operation 352). Process 300 is then at an end.

Returning to operation 336, if the writing of write A has not begun, process 300 calls for determining whether any overlapping writes that are in the process of being stored are incomplete (operation 358). If any overlapping writes are in the process of being stored and are incomplete, process 300 calls for waiting for these writes to complete locally.

Once any overlapping writes being processed are complete, process 300 calls for selecting the latest overlapping write for storage (operation 362). This may, for example, be determined based on the sequence index. Process 300 also calls for determining whether write A was selected (operation 364). If write A was selected, process 300 calls for, among other things, finishing the write of A locally (operation 344), returning a local success for write A (operation 346), and returning success for the earlier overlapping writes (operation 348).

If, however, write A was not selected, process 300 calls for storing the selected write (operation 366). Process 300 also calls for determining whether the storage for the selected write is complete (operation 368). If the storage of the selected write is not complete, process 300 calls for waiting for the storage to complete.

Once the storage of the selected write is complete, process 300 calls for returning a local success for write A (operation 328) and completing write A to the originating external system (operation 332) once it has been completed at the other storage system(s) (operation 330). Process 300 is then at an end.

The reason for waiting for the overlapped write to finish being written before completing write A is a subtlety for proper storage behavior. Assume a location currently contains data x, and there are writes updating it to y from system A and z from system B. If the write containing z has a later sequence index but is processed first on a storage system, process 300 omits actually writing y to the physical storage. If, however, the process sends a completion message for write y to the originating external system before write z has finished being written, that external system could choose, for example, to immediately re-read that location to verify the data, which could result in the external system seeing x on the physical storage rather than y or z. Thus, this may lead to a situation where a write has apparently been completed successfully, but the data on the volume has not updated, which breaks the data consistency expectations for storage systems. It is acceptable for the data to be either y or z after the completion of write y to the originating external system, as there were writes containing both sets of data submitted contemporaneously.

Although FIGS. 3A-D illustrate an example process for managing remote data replication, other processes for managing remote data replication may include fewer, additional, and/or a different arrangement of operations. For example, requesting a sequence index may be performed as soon as a write request has been received. As another example, determining whether sequence numbers for overlapping writes have been received (operation 322) may be performed after determining whether the writing of write A has begun (operation 336). As a further example, process 300 could be performed contemporaneously for a number of writes received at a storage system.

Furthermore, although FIGS. 3A-D illustrate a process for managing writes received from an external system, managing writes received from other storage systems may be similarly managed, although with typically fewer operations. For example, if a storage system receives a write from another storage system, the receiving storage system may determine whether the write overlaps any incomplete writes and begin local storage processing for the write if no overlapping incomplete writes exist. However, the storage system would not request a sequence index or send the write to the other storage system(s), as the originating storage system has already performed those operations. The process could then proceed as in process 300.

One of the features of the described implementation is that it ensures correct behavior by preventing write completion to external systems until write ordering has been resolved. An alternative implementation could instead identify reads to a region where the write ordering is as-yet unresolved, and delay such reads until the write ordering has been resolved. This would allow process 300 to be simplified by omitting operation 368. By completing write A sooner in that case, the apparent responsiveness of the system can be increased, and, thus, the external systems can increase their write throughput.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 4:
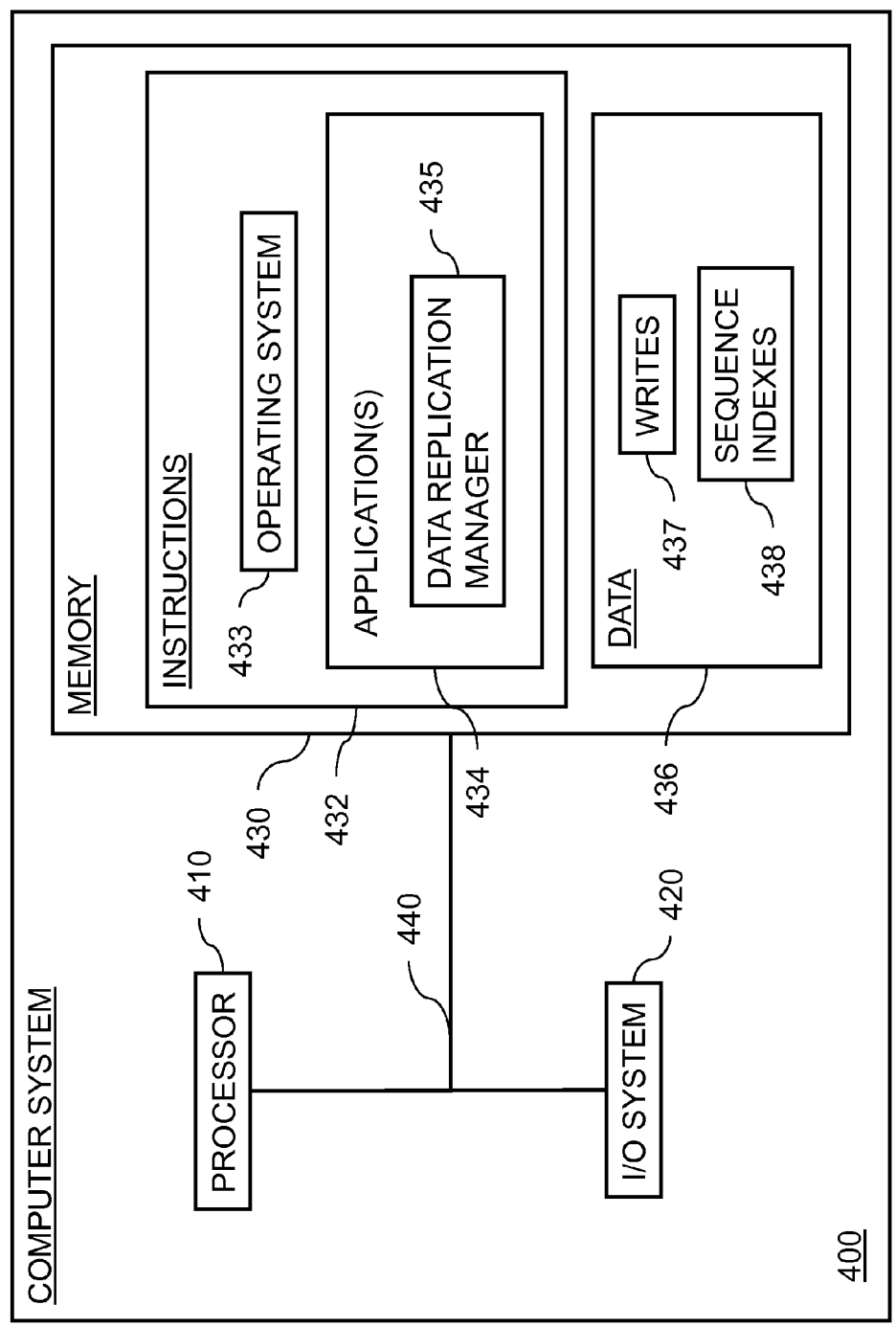
FIG. 4 is a block diagram illustrating an example computer system for managing remote replication of data.

FIG. 4 illustrates an example computer system 400 for managing the remote replication of data. System 400 includes a processor 410, an input/output system 420, and memory 430, which are coupled together by a network 440. As illustrated, computer system 400 is functioning as a storage controller, but other computer systems for managing data replication could have a similar configuration.

Processor 410 typically includes a logical processing unit (e.g., an arithmetic logic unit) that processes data under the direction of program instructions (e.g., from software). For example, processor 410 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 420 may include one or more communication interfaces and/or one or more user interfaces. A communication interface may, for instance, be a network interface card (whether wireless or wireless) or a modem. A user interface could, for instance, be a user input device (e.g., a keyboard, a keypad, a touchpad, a stylus, a mouse, or a microphone) or a user output device (e.g., a monitor, a display, or a speaker). In general, input/output system 420 may be any combination of devices by which a computer system can receive and output data.

Memory 430 may, for example, include random access memory (RAM), read-only memory (ROM), flash memory, and/or disc memory. Various items may be stored in different portions of the memory at various times. Memory 430, in general, may be any combination of devices for storing data.

Memory 430 includes instructions 432 and data 436. Instructions 432 include an operating system 433 (e.g., Windows, Linux, or Unix) and applications 434, which include a data replication manager program 435. Data 436 includes writes 437 that are to be stored and sequence indexes 438. The writes may be stored in storage other than memory 430. That is, the write may be residing temporarily in memory 430.

Network 440 is responsible for communicating data between processor 410, input/output system 420, and memory 430. Network 440 may, for example, include a number of different types of busses (e.g., serial and parallel).

In certain modes of operation, computer system 410 may receive writes 437 and sequence indexes 438 through I/O system 420 and determine the proper storage order for the writes based on the sequence indexes. If the writes originate from an external system, processor 410 may generate a request for a sequence index. The writes do not, however, have to be stored in sequence order. That is, writes may be stored out of order. Moreover, some writes may not actually be stored. For example, they may be skipped in favor of later writes. Processor 410 may accomplish these operations according to the processes and techniques discussed above.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for managing the remote replication of data, and several others have been mentioned or suggested. Moreover, those skilled in the art will readily recognize that a variety of additions, deletions, modifications, and substitutions may be made to these implementations while still achieving remote data replication management. Thus, the scope of the protected subject matter should be judged based on the following claims, which may capture one or more concepts of one or more implementations.

The invention claimed is:

1. A system comprising:
an index generator adapted to receive a plurality of requests and generate a plurality of responses for each request, each response containing a sequenced index based on the order in which the request was received;
at least two storage systems communicating with each other to store writes received from one or more external systems in a synchronous manner, each storage system adapted to:
receive writes from an external system;
request an index from the index generator for each write;
send the writes to the at least one other storage system;
receive writes from the at least one other storage system;
receive indexes from the index generator for writes from the at least one other storage system independently of the writes received from the at least one other storage system;
store the writes from the external system and the at least one other storage system based on the ordered indexes received from the index generator; and
report a completion of the writes received from the external system to the external system after completion of the writes on the at least one other storage system.

2. The system of claim 1, wherein each storage system is adapted to:

determine whether there is an incomplete overlapping write when a write is received at the storage system from either the external system or the at least one other storage system; and begin storing the received write if no incomplete overlapping write exists.

3. The system of claim 2, wherein each storage system is adapted to skip storing an overlapping write associated with an earlier index if a write associated with a later index is already in the process of being stored.

4. The system of claim 3, wherein the storage system is adapted to report a completion of the overlapping write associated with the earlier index after the write associated with the later index completes.

5. The system of claim 1, wherein the storage system is adapted to report a completion of an incomplete write associated with an earlier index after an overlapping write associated with a later index completes.

6. The system of claim 1, wherein each storage system is adapted to skip storing an overlapping write associated with an earlier index if a write associated with a later index is already in the process of being stored.

7. The system of claim 1, wherein each storage system is adapted to:
determine whether there is an incomplete overlapping write when it receives a write from either the external system or the at least one other storage system; and
hold storing of the received write if an overlapping incomplete writes exists.

8. The system of claim 7, wherein each storage system is adapted to:
determine whether the sequence index has been received for the received write;
determine whether any overlapping writes are incomplete;
store the received write if no overlapping writes are incomplete;
select the latest overlapping, incomplete write if an overlapping write is incomplete;
write the selected write; and
report the overlapping writes as being complete after the selected write is complete.

9. A computer program product for managing remote data replication, the computer program product comprising:
a non-transitory computer readable medium;
first program instructions to determine whether writes from an external system have been received;
second program instructions to generate a request for an ordered index for each write;
third program instructions to send the writes to at least one storage system;
fourth program instructions to determine whether writes from the at least one storage system have been received;
fifth program instructions to determine whether ordered indexes for the writes from the at least one storage system have been received, the ordered indexes received independently of the writes received from the at least one storage system;
sixth program instruction to store the writes from the external system and the at least one storage system based on the indexes; and
seventh program instructions to report a completion of the writes received from the external system to the external system after completion of the writes on the at least one storage system; and
wherein said program instructions are stored on said non-transitory computer readable storage medium.

10. The computer program product of claim 9, further comprising eighth program instructions to determine whether there is an incomplete overlapping write when a write is received from either the external system or the at least one storage system and begin storing the received write if no incomplete overlapping write exists.

11. The computer program product of claim 10, further comprising ninth program instructions to skip the storing of an overlapping write associated with an earlier index if a write associated with a later index is already in the process of being stored.

12. The computer program product of claim 11, further comprising tenth program instructions to report a completion of the overlapping write associated with the earlier index after the write associated with the later index completes.

13. The computer program product of claim 9, wherein further comprising eighth program instructions to report a completion of an incomplete write associated with an earlier index while after an overlapping write associated with a later index completes.

14. The computer program product of claim 9, further comprising tenth program instructions to skip the storing of an overlapping write associated with an earlier index if a write associated with a later index is already in the process of being stored.

15. The computer program product of claim 9, further comprising eleventh program instructions to determine whether there is an incomplete overlapping write when a write is received from either the external system or the at least one storage system and hold storing of the received write if an overlapping incomplete write exists.

16. The computer program product of claim 15, further comprising:
twelfth program instructions to determine whether the sequence index has been received for the received write;
thirteenth program instructions to determine whether any overlapping writes are incomplete;
fourteenth program instructions to store the received write if no overlapping writes are incomplete;
fifteenth program instructions to select the latest overlapping, incomplete write if an overlapping write is incomplete and store the selected write; and
sixteenth program instructions to report the overlapping writes as being complete after the selected write is complete.

17. A system, comprising:
a first storage system;
a second storage system; and
an index generator; and
wherein the first storage system is operable to receive a write from an external system, the first storage system operable to initiate writing of the write and send the write to the second storage system;
wherein the first storage system is further operable to send a request for a sequence index for the write received from the external system to the index generator;
wherein the first storage system is operable to receive an overlapping write from the second storage system;
wherein the first storage system is operable to receive a first sequence index for the write received from the external system and a second sequence index for the overlapping write received from the second storage system, the first and second sequence indexes received independently of the writes received from the respective external and second storage systems;
wherein the first storage system is operable to determine whether the second sequence index is earlier than the first sequence index and, responsive to determining that the second sequence index is earlier than the first sequence index, skip writing of the write received from the second storage system and complete writing of the write received from the external system;

wherein the first storage system is further operable to report to the second storage system completion of the write received from the second storage system and determine whether the write received from the external system has completed on the second storage system; and wherein the first storage system is further operable to, responsive to determining that the write received from the external system has completed on the second storage system, report to the external system completion of the write received from the external system.

* * * * *